Aug. 4, 1936.     F. HARDINGE     2,049,498
OIL PURIFYING SYSTEM
Filed June 4, 1934     2 Sheets-Sheet 2

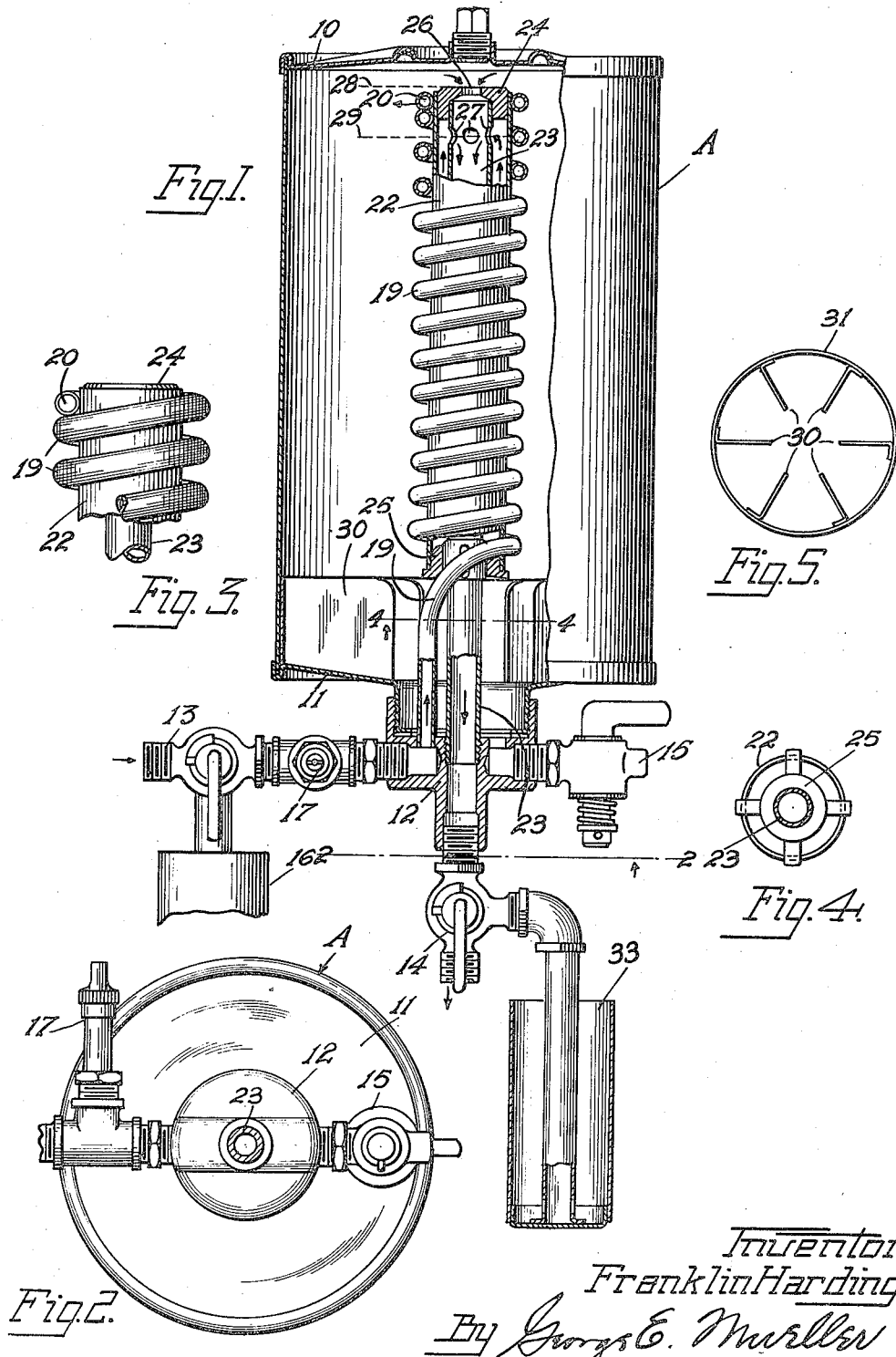

Inventor:
Franklin Hardinge
By George E. Mueller
Atty

Patented Aug. 4, 1936

2,049,498

UNITED STATES PATENT OFFICE 2,049,498

OIL PURIFYING SYSTEM

Franklin Hardinge, Chicago, Ill.

Application June 4, 1934, Serial No. 728,896

10 Claims. (Cl. 210—57)

My invention relates to oil purifying systems, and has to do more particularly with systems for use in connection with internal combustion engines although not limited to such use. My system and the apparatus therefor is of a character adapted for interposition in an oil feed line and arranged to purify or clarify the oil by collecting suspended or foreign matter therein.

One of the objects of my invention is to provide apparatus of the above character adapted to purify the oil without the use of the usual filter pack.

Another object of my invention is to provide an oil purifying system adapted for use with internal combustion engines and other oil feed systems, arranged to collect suspended or foreign matter without the use of a filter pack and preferably being provided with a storage space or tank through which the oil passes and in which a body of oil is interposed in a path in shunt to the main feed and slowly changing, compared with the volume of oil passing in the main feed, so as to permit a settling of foreign matter.

There are various features to my invention which will be more particularly pointed out in the ensuing part of the specification and appended claims.

In the ordinary oil purifying systems as now used on internal combustion engines for automobiles, filter packs are commonly employed in filter tanks, and in such apparatus the tanks are under pressure of the oil feed system and the filter packs act as a resistance to the flow of the oil through the filter tank. It is then necessary to change such filter packs in order to maintain the system in an effective state.

In such filtering apparatus wherein filter packs are located in the tanks, such tanks are under pressure of the feed pump and this is objectionable in some cases. Also, such packs clog in time and interfere with the passage of the oil.

One of the features of my invention is the provision of a purifying or clarifying apparatus which obviates the use of such filter packs and avoids pressure in the tank, but in which the suspended foreign matter settles to the bottom of a body of oil which is constantly changing at a low rate and from which the foreign matter may be readily drawn by merely opening a valve.

Another object of my invention is to provide purifying apparatus in which the oil passes through by gravity and obviates the pressure inside the settling or purifying tank.

Further features will be brought out in the specification and appended claims.

Referring to the accompanying drawings for a preferred form of my invention,

Fig. 1 is a side elevation partly in section, of the apparatus adapted to be interposed in the oil feed line;

Fig. 2 is a sectional view along the line 2—2 of Fig. 1, looking in the direction of the arrows indicated thereon;

Fig. 3 is a view of the upper portion of the feed pipe with its outlet at the upper end;

Fig. 4 is a sectional view along the line 4—4 of Fig. 1;

Fig. 5 is a view of a vane frame adapted to set loosely in the bottom of the tank to prevent undue circular movement of the oil at that portion of the tank.

Figure 6:
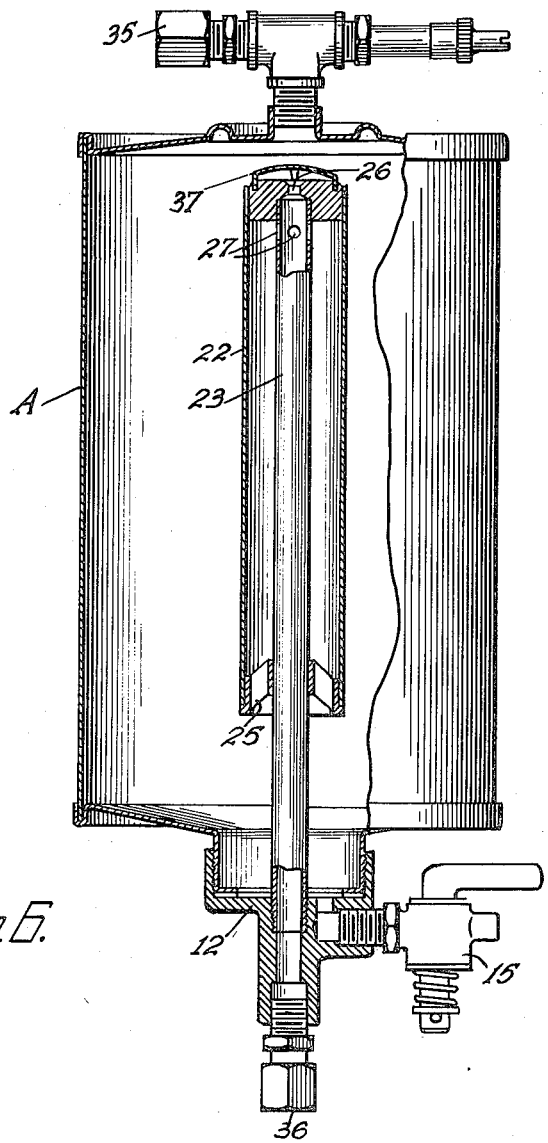
Fig. 6 is another form of settling tank.

Referring now more in detail to the apparatus illustrated in Figs. 1 to 5, it includes a storage tank A of a suitable capacity, depending upon the system in which it is employed, and which is ordinarily of about one quart capacity for the ordinary automobile engine. The tank includes a top 10 and bottom 11 which is removably threaded into a base 12 to which an inlet valve 13 and outlet valve 14 are secured, and a drain cock 15. The inlet valve 13 connects through a T connection carrying an ordinary tire valve 17 through which air pressure may be applied for cleaning out the apparatus. The inlet connection 13 extends to a resistance tube 19 having an outlet 20 at its upper end, said tube serving to reduce the pressure and reduce the amount of oil that is being fed into the tank. In other words, this tube reduces the pressure of the oil fed to the tank by offering a resistance to the oil flow and thereby reduces the amount of oil flowing into the tank. It must, however, supply sufficient oil to be passed into the tank for settling, or to the bearings to be fed. To this end I have found that for an ordinary 6-cylinder engine in which the pump pressure is in the neighborhood of 20 pounds, a copper tube having a ⅛ inch hole and 26 inches long, when wound with a ⅞ inch internal diameter, is suitable.

This feed pipe 19 may be supported inside or outside the tank in any suitable manner but I preferably wrap it around the intermediate tube 22 which in turn is supported upon a central outlet tube 23 threaded into the base 12. This center tube 23 has a collar 24 secured to its upper end frictionally removably supporting the tube 22 and feed pipe 19. The lower end of tube 19 is removably inserted in the base 12. The lower end of tube 22 is concentrically held around the supporting tube 23 by a spider 25 which permits the oil to flow upwardly through the annular passage between the central tube 23 and outer tube or skirt 22 as indicated by the arrows.

At the upper end of the outlet tube 23, I provide two sets of openings, one opening through which oil may flow directly into central tube 23, and a plurality of openings 27 through which oil flows from the tank by way of a shunt path in the annular space between tubes 22 and 23.

These two openings 26 and 27 are disposed at different levels in the tank as indicated by dotted lines 28 and 29 so that when the apparatus is in operation and the oil has been fed through outlet 20 to fill the tank to the upper level 28, the amount of oil fed to the tank from outlet 20 is such that a portion of the oil flows over the top of the central tube through opening 26, and another portion flows up through the annular space between the tubes and through openings 27 and the central tube 23. Thus the oil fed through the central openings 27 is that amount forced through by the pressure exerted due to the head of oil existing between levels 29 and 28. The remaining oil flows through opening 26 as it flows over the top of the collar 24.

The area of openings 27 is preferably proportionately smaller than the opening 26, so that the greater amount of oil flows through the top 26, and only a small amount is fed through the body of oil in the tank. In this way there is a constant change of oil in the tank A by but a small feed, thus permitting this oil to stay in the tank long enough so that suspended foreign matter will settle to the bottom of the tank where there is the least motion of oil and which is beneath the inlet through the spider 25. Thus the shunt paths are so proportioned and arranged that one, that passing under the skirt or baffle tube 22 to the lower level outlet, draws the body of oil downwardly to effect a slow change thereof with the least disturbance.

In order to further prevent shaking up of oil at the bottom of the tank I provide a number of vanes as 30 set in a ring 31 which is loosely set into the bottom of the tank with the vanes projecting up in oil about even with the inlet at the bottom of spider 25.

*Operation of Figs. 1 to 5*

Considering the form of my invention as shown in Figs. 1 to 5, this is interposed in an oil feed line and when used in connection with the oiling system of an internal combustion engine the inlet connection 13 is connected with a pipe leading from the oil circulating pump and the outlet connection 14 connected with a return pipe leading to the crank case where the oil is returned after passing through the clarifier tank A.

Assuming that the apparatus is connected as last stated, and it is started into operation, oil from the pump is passed through the inlet 13, then through the resistance tube 19 to its outlet 20 at the upper end. This oil flows into the tank A until it reaches the level 29 when it begins to pass through the openings 27 in the inner tube 23 and downwardly through the outlet 14 to the crank case. The amount of oil fed through the tube 19 is greater than what will be carried away through the openings 27, so that the tank continues to fill until the oil reaches the level of line 28 when it passes down through the center opening 26 and the tube 23 to the outlet. It will thus be seen that parallel or shunt paths are provided for the outflow of the oil that comes from the opening 20 of the resistance tube 19, part of this fed oil passing over the top through the center opening 26 and part of the oil flowing downwardly through the tank and upwardly between the tubes 22 and 23 and through the openings 27. Thus, by the slow change of oil in the tank A the sediment or other foreign matter in the oil has time to settle to the bottom of the tank where there is least agitation of the oil, where such sediment or suspended matter may be drawn off through the valve 15. This flow through the inner openings 27 is brought about by gravity due to the difference between the level lines 29 and 28, in other words merely by pressure from the amount of oil between the level lines 29 and 28. The surplus oil is flowing over the top through the center opening 26.

By providing the surplus outlet 26 at the top, the oil in the tank is not under pressure of the pump, obviating the objectionable pressure in the tank A and at the same time providing a constant change of oil in the tank, but slow enough to permit settling of suspended foreign matter to purify or clarify the oil without a filter pack. Thus I provide a combination force feed and gravity feed of the oil without setting up a pressure in the tank and effect a clarifying of the oil.

As previously pointed out, the oil fed through the resistance pipe 19 is under pressure, but due to the diameter and length of this pipe sufficient resistance is set up therein to limit the flow to the tank A to a desired amount to bring about the clarifying action. This pipe 19 may be varied in diameter and length according to the pressure of the oil so as to limit it to the desired feed.

Thus I provide a large bulk of oil in the settling tank A and by the provision of the outlets at two levels permit a circulation of a definite amount of oil through the system but only a comparatively small proportion through the settling tank to eliminate disturbance therein and purify the oil by collecting the suspended matter at the bottom of the tank.

In order to determine the rate of flow of oil being fed to the apparatus, and the rate of oil being passed at the outlet, I provide measuring cups 16 and 33 at the inlets and outlets respectively. When the system is operating efficiently the pressure at the inlet valve 13 is a great deal higher than at the outlet valve 14, because at the outlet the oil is simply flowing out by gravity. By operating the valve at the respective cups and knowing the capacity of the cups, the time required to fill a cup will tell whether the apparatus is working effectively. For instance, with a 20 pound pressure in the inlet 13 and with the resistance tube 19 proportioned as previously specified, it takes five times as long to fill the cup 33 as the cup 16, and if the timing indicates this proportion of flow it may be determined whether or not the apparatus is working effectively and the resistance tube 19 functioning to properly retard the feed.

*Construction and operation of Fig. 6*

Referring to the apparatus shown in Fig. 6, this is preferably arranged to be interposed in an oil pressure line where external means take the place of the resistance tube 19 to retard the flow of oil. For instance, the tank of Fig. 6 may be interposed between the oil feed pump and the main bearings of the engine which are ordinarily fed directly from the pump and in this way the flow of oil through the tank is intercepted or retarded sufficiently to retain the body of oil long enough to permit settling of the foreign matter.

In this form of device the inlet 35 is connected to the oil feed pump and the outlet 36 to the feed line extending to the bearings which are to be lubricated and which bearings act as the resistance to retard the flow through the settling tank A. Thus in this form of the invention the resistance tube 19 is eliminated. When put into operation, the oil flows through the inlet 35 until the oil starts to flow through the inner outlet openings 27, but the tank still continues to be fed by oil until completely full, so that the oil is also flowing out of the upper central opening 26, but the tank is under pressure of the pump.

Thus, as in the first form of the invention, a shunt or parallel path for the flow of the oil is provided, one outlet being through the center opening 26 and the other through the openings 27. In this way a small amount of the oil is passing through the settling tank A, but slow enough to cut down the disturbance of the oil in the tank and permit settling of suspended matter to the bottom where it may be drawn off by the relief valve 15. In this form of settling tank the oil is fed to the top of the tank as in the other form, and that portion which supplies the tank permits the oil in the tank to flow downwardly in the outer annular portion, then upwardly between the intermediate sleeve 22 and inner tube 23 and then through the openings 27 and downwardly through the tube 23 to the outlet. The other portion of the oil flows directly through the upper central opening 26 and in this way I supply the shunt paths and provide the time necessary for settling of the oil in the settling tank A. It will be noted that I place a baffle 37 over the opening 26 to prevent the oil from the feed line 35 going directly down into the opening 26.

In the ordinary oiling system, oil is taken directly from the bottom of the crank case, where the oil is the dirtiest, and fed directly to the main bearings. Should an oil purifier of the filter pack type be interposed between the pump and bearings and the filter pack become clogged so as to retard or intercept the flow, the bearings would not be supplied with oil and would burn out.

My improved apparatus overcomes this danger and may be interposed between the pump and bearings.

I claim:

1. In an oil clarifying system, a settling tank having inlet and outlet connections for interposing the tank in an oil feed line, and an outlet conductive path inside the tank arranged to maintain a body of oil in the tank but to cause a flow of the body of oil in the tank from the top of the tank toward the bottom, then upwardly and then downwardly out of the tank to slowly change the body of oil in the tank, and a second outlet at the top of the tank to permit oil to flow from the top of the body of oil independent of the said first outlet path.

2. In an oil clarifying system, a settling tank having inlet and outlet connections for interposing the tank in an oil feed line, outlet openings at different levels inside the tank connected with the outlet connection, and a protective skirt extending downwardly from one of said outlet openings toward the bottom of the tank, whereby oil entering the tank flows through shunt paths to the outlets at different levels.

3. In an oil clarifying system, a settling tank having inlet and outlet connections for interposing the tank in an oil feed line, said inlet connection including an extensive coil on the inside of said tank, outlet openings at different levels inside the tank connected with the outlet connection, and a protective skirt extending downwardly from the lower one of said outlet openings toward the bottom of the tank, whereby oil entering the tank flows through shunt paths to the outlets at different levels.

4. In an oil clarifying system, a settling tank having inlet and outlet connections for interposing the tank in an oil feed line, the oil inlet for the tank being at the top end thereof, outlet openings at different levels inside the tank connected with the outlet connection, and a protective skirt extending downwardly from the lower one of said outlet openings toward the bottom of the tank, whereby oil entering the tank flows through shunt paths to the outlets at different levels.

5. In an oil clarifying system, a settling tank, an inlet for feeding oil to the tank, two oil outlets for the tank, one outlet being at a level above the other outlet, the oil feed being sufficient to maintain a body of oil at least to the upper level outlet, and an oil conduit leading from the lower portion of the tank to the lower outlet whereby the head of oil between the outlet levels forces the oil up from the bottom part of the tank to the lower level outlet to constantly but comparatively slowly change the body of oil in the tank at a rate to permit settling of suspended foreign matter to the bottom of the tank.

6. In an oil clarifying system, a settling tank adapted to be interposed in an oil feed line, a feed pipe for the tank for maintaining a substantial pressure resistance to the flow of oil to the tank, and two oil outlets for the tank, one outlet being at a level above the other outlet, the oil feed being sufficient to maintain a body of oil at least to the upper level outlet, and an oil conduit leading from the lower portion of the tank to the lower outlet, whereby the head of oil between the outlet levels forces the oil up from the bottom part of the tank to the lower level outlet to constantly but comparatively slowly change the body of oil in the tank at a rate to permit settling of suspended foreign matter to the bottom of the tank.

7. In an oil clarifying system, a settling tank adapted to be interposed in an oil feed line, oil outlets for the tank at different levels, an oil feed inlet for maintaining a body of oil at least to the uppermost level outlet, one of said outlets being disposed to permit oil to flow out from the top portion of the tank, and the other outlet to permit oil to flow from the bottom part of the tank to change the body of oil in the tank at a rate to permit settling of suspended foreign matter to the bottom of the tank.

8. In an oil clarifying system, a settling tank having inlet and outlet connections for interposing the tank between the oil pump and bearings respectively of an internal combustion engine, oil outlets inside the tank leading to the outlet connection, said outlets being at different levels, one of said outlets being disposed to permit oil to flow out from the top portion of the tank and the other outlet to permit oil to flow from the bottom part of the tank to change the body of oil in the tank at a rate to permit settling of suspended foreign matter to the bottom of the tank.

9. In an oil clarifying system, a settling tank, an inlet for feeding oil to the tank, an outlet tube extending upwardly inside the tank, said tube having oil outlet openings therein at different levels, and an intermediate tube surrounding the outlet tube as a skirt to provide an annular space between the tubes and positioned to permit oil to flow directly into the outlet opening at an upper level and to flow under the skirt from the bottom part of the tank to an outlet at a lower level, said outlets being proportioned relative to the inlet to maintain a body of oil in the tank constantly changing at a rate to permit settling of foreign matter therein.

10. In an oil clarifying system, a settling tank having inlet and outlet connections for interposing the tank between the oil pump and bearings respectively of an internal combustion engine, said connections adapted to fill and maintain the tank under pressure of the pump, oil outlets inside the tank leading to the outlet connection, said outlets being at different levels, one of said outlets being disposed to permit oil to flow out from the top portion of the tank and the other outlet to permit oil to flow from the bottom part of the tank to change the body of oil in the tank at a rate to permit settling of suspended foreign matter to the bottom of the tank.

FRANKLIN HARDINGE.